United States Patent
Masaki et al.

(10) Patent No.: US 8,700,948 B2
(45) Date of Patent: Apr. 15, 2014

(54) STORAGE AREA MANAGING APPARATUS AND STORAGE AREA MANAGING METHOD

(75) Inventors: Atsushi Masaki, Kawasaki (JP); Kenichi Fujita, Kawasaki (JP); Koutarou Sasage, Kawasaki (JP); Akira Satou, Kawasaki (JP); Hiroshi Shiomi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 406 days.

(21) Appl. No.: 12/640,391

(22) Filed: Dec. 17, 2009

(65) Prior Publication Data

US 2010/0169575 A1    Jul. 1, 2010

(30) Foreign Application Priority Data

Dec. 25, 2008  (JP) .................................. 2008-330700

(51) Int. Cl.
*G06F 11/08*        (2006.01)

(52) U.S. Cl.
USPC .......................... 714/6.21; 711/114; 714/6.22

(58) Field of Classification Search
None
See application file for complete search history.

(56) References Cited

U.S. PATENT DOCUMENTS

| | | | |
|---|---|---|---|
| 5,666,512 A | | 9/1997 | Nelson et al. |
| 7,506,187 B2 * | | 3/2009 | Maddock ....................... 713/310 |
| 7,805,633 B2 * | | 9/2010 | Sangapu et al. ............. 714/6.32 |
| 8,032,785 B1 * | | 10/2011 | Brown et al. ................ 714/6.32 |
| 8,099,623 B1 * | | 1/2012 | Li et al. ......................... 714/6.22 |
| 2006/0031648 A1 | | 2/2006 | Ishikawa et al. |
| 2006/0112302 A1 * | | 5/2006 | Cherian ............................ 714/6 |
| 2007/0067666 A1 | | 3/2007 | Ishikawa et al. |
| 2008/0005612 A1 | | 1/2008 | Arai |
| 2008/0184000 A1 | | 7/2008 | Kawaguchi |

FOREIGN PATENT DOCUMENTS

| | | |
|---|---|---|
| JP | 08-221876 | 8/1996 |
| JP | 2006-053601 | 2/2006 |
| JP | 2007-087039 | 4/2007 |
| JP | 2007-128183 | 5/2007 |
| JP | 2008-009767 | 1/2008 |
| JP | 2008-186172 | 8/2008 |

OTHER PUBLICATIONS

Japanese Office Action for corresponding Japanese Application 2008-330700; dated Nov. 30, 2010.

* cited by examiner

*Primary Examiner* — Gary Portka
(74) *Attorney, Agent, or Firm* — Staas & Halsey LLP

(57) ABSTRACT

A storage area managing apparatus includes a managing unit for managing a plurality of logical volumes provided by a plurality of storage drive groups for storing data redundantly, and a rebuilding controller for generating recovery data when at least one of the drive groups is degraded on the basis of the data stored in the degraded drive group and generating a selected logical volume on the basis of the capacity of the recovery data, the rebuilding controller controlling the management unit for managing first logical volumes to correspond to a part of the plurality of storage drive groups except for the degraded drive group. The storage area managing apparatus includes a first transferring unit for transferring the recovery data to the part of the plurality of storage drive groups as indicated by the selected logical volume.

12 Claims, 14 Drawing Sheets

FIG. 5

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |

First four rows: COPIED
Remaining rows: UNCOPIED

FIG. 12

| 0 | 0 | 0 | 0 | 0 | 0 | 0 | 0 | 0 | 0 | }          |
|---|---|---|---|---|---|---|---|---|---|------------|
| 0 | 0 | 0 | 0 | 0 | 0 | 0 | 0 | 0 | 0 | COPIED     |
| 0 | 0 | 0 | 0 | 0 | 0 | 0 | 0 | 0 | 0 |            |
| 0 | 0 | 0 | 0 | 0 | 0 | 0 | 0 | 0 | 0 |            |
| 1 | 1 | 1 | 1 | 1 | 1 | 1 | 1 | 1 | 1 | } UNCOPIED |
| 1 | 1 | 1 | 1 | 1 | 1 | 1 | 1 | 1 | 1 |            |
| 1 | 1 | 1 | 1 | 1 | 1 | 1 | 1 | 1 | 1 | } HS SPACE |
| 1 | 1 | 1 | 1 | 1 | 1 | 1 | 1 | 1 | 1 |            |
| 1 | 1 | 1 | 1 | 1 | 1 | 1 | 1 | 1 | 1 |            |
| 1 | 1 | 1 | 1 | 1 | 1 | 1 | 1 | 1 | 1 | } UNCOPIED |

FIG. 13

| 0 | 0 | 0 | 0 | 0 | 0 | 0 | 0 | 0 | 0 | }                          |
|---|---|---|---|---|---|---|---|---|---|----------------------------|
| 0 | 0 | 0 | 0 | 0 | 0 | 0 | 0 | 0 | 0 | COPIED                     |
| 0 | 0 | 0 | 0 | 0 | 0 | 0 | 0 | 0 | 0 |                            |
| 0 | 0 | 0 | 0 | 0 | 0 | 0 | 0 | 0 | 0 |                            |
| 1 | 1 | 1 | 1 | 1 | 1 | 1 | 1 | 1 | 1 | } UNCOPIED                 |
| 1 | 1 | 1 | 1 | 1 | 1 | 1 | 1 | 1 | 1 |                            |
| 1 | 1 | 1 | 1 | 1 | 1 | 1 | 1 | 1 | 1 | } RELEASED HS SPACE        |
| 1 | 1 | 1 | 1 | 1 | 1 | 1 | 1 | 1 | 1 |   (UNCOPIED)               |
| 1 | 1 | 1 | 1 | 1 | 1 | 1 | 1 | 1 | 1 |                            |
| 1 | 1 | 1 | 1 | 1 | 1 | 1 | 1 | 1 | 1 | } UNCOPIED                 |

US 8,700,948 B2

STORAGE AREA MANAGING APPARATUS AND STORAGE AREA MANAGING METHOD

CROSS-REFERENCE TO RELATED APPLICATION

This application is based upon and claims the benefit of priority of the prior Japanese Patent Application No. 2008-330700, filed on Dec. 25, 2008, the entire contents of which are incorporated herein by reference.

FIELD

The embodiments discussed herein are related to techniques for managing logical volumes in storage devices.

BACKGROUND

Storage virtualization is known as a technique for centrally managing storage volumes of multiple storage devices included in a system as virtual volumes. According to the storage virtualization technique, arbitrary areas carved from multiple volumes in storage devices are defined as virtual volumes. Such virtual volumes provide a host system (an upper system) or the like requesting storage resources with a requested storage capacity at a requested time.

In the following, such virtual volumes will be described with reference to FIG. 15. FIG. 15 illustrates a conventional system for providing virtual volumes to host systems.

The system illustrated in FIG. 15 includes a plurality of storage devices 200 (200a to 200d), a plurality of host systems 300 (300a to 300c), and a plurality of virtualization devices connected between the storage devices 200 and the host systems 300. In such a system (hereinafter referred to as a virtualized system), a virtual switch 100 registers storage volumes of the storage devices 200a to 200d as LUNs (logical unit numbers) 201a to 201g. Further, the virtual switch 100 provides the host systems 300a to 300c with these LUNs 201a to 201g as virtual volumes (VLUN (virtual logical unit numbers)) 301a to 301c, respectively, each having a specified capacity. This causes each of the host systems 300a to 300c to recognize the storage volumes configured with the multiple LUNs as a single volume. Data written to the virtual volumes are substantially written to the storage volumes of the storage devices that constitute the virtual volumes.

According to the system described above, when the capacity of each of the storage devices is 1 Tbyte, and the capacity requested by one of the host systems is 1.5 Tbytes, it does not need to allocate two or more storage devices to the host system. In this case, the virtual switch combines three 0.5-Tbyte LUNs to be provided to the host system as one volume of 1.5 Tbytes.

Techniques related to the technique which will be discussed include a data processing system, a data processing method, and a storage apparatus. According to the system, when a failure occurs in a part of a plurality of first memory areas and there is no spare second memory area to migrate data in the faulty part of the first memory areas, another part of the first memory areas is dynamically reserved as a second memory area. There is Japanese Laid-open Patent Publication No. 2008-009767 as a reference document.

However, in order to overcome degradation of storage devices in such a virtualized system as illustrated in FIG. 15, hot spare storage devices may be prepared for the individual storage devices to maintain redundancy. That is, when the scale of the virtualization system increases, the number of storage devices increases. Proportionally to the increase in the number of storage devices, the number of requested hot spare storage devices also increases. In addition, the storage capacity of a hot spare storage device needs to be larger than that of a corresponding storage device. Thus, the amount of storage resources that may not be effectively used increases with increasing capacity of each storage device in a virtualized system.

SUMMARY

According to an aspect of the embodiment, a storage area managing apparatus for managing a plurality of storage drive groups each of which has a plurality of storage drives providing redundancy for each other, the storage area managing apparatus includes a managing unit for managing a plurality of logical volumes provided by the plurality of storage drive groups for storing the data redundantly, a rebuilding controller for generating recovery data, when at least one of the storage drive groups is degraded on the basis of the data stored in the degraded storage drive group, and generating a selected logical volume on the basis of the capacity of the recovery data, the rebuilding controller controlling the management unit for managing first logical volumes to correspond to a part of the plurality of storage drive groups except for the degraded storage drive group, and a first transferring unit for transferring the recovery data to the part of the plurality of storage drive groups as indicated by the selected logical volume.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates a bitmap table.

FIG. 12 illustrates a bitmap table corresponding to a virtual volume in which a hot spare space has been set.

FIG. 13 illustrates a bitmap table corresponding to a virtual volume in which the setting of the hot spare space has been released.

DESCRIPTION OF EMBODIMENTS

Figure 1:
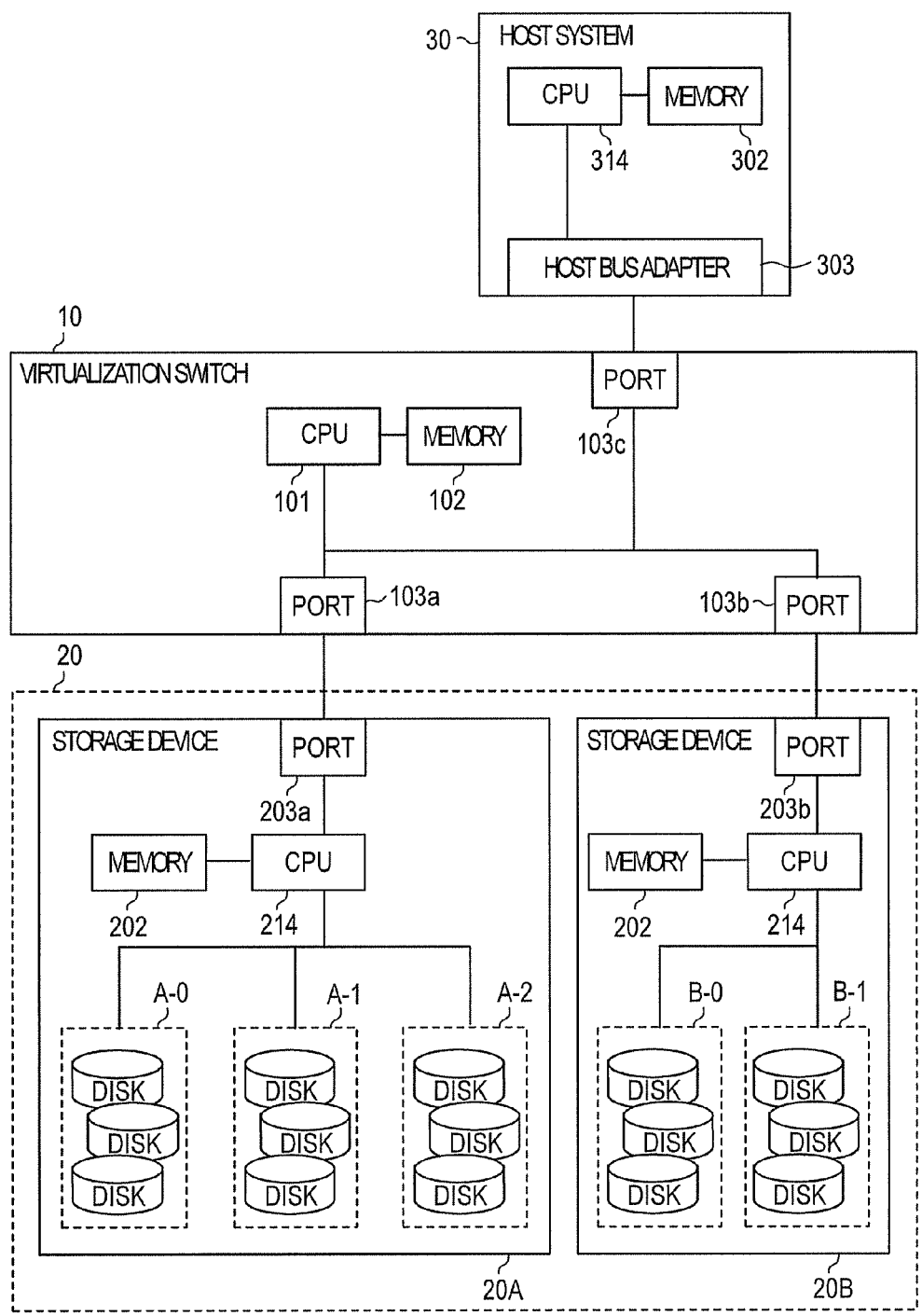
FIG. 1 illustrates a virtualized system.

In the following, a preferred embodiment of the present technique will be described with reference to the drawings. Firstly, a virtualized system according to the present embodiment and hardware configurations of devices constituting the system will be described. FIG. 1 illustrates a virtualized system according to the present embodiment.

As illustrated in FIG. 1, the virtualized system according to the present embodiment includes a virtualization switch 10, a plurality of storage devices 20 (storage devices 20A and 20B), and a host system 30.

The virtualization switch (storage area managing apparatus) 10 comprises hardware components including a CPU 101, a memory 102, a port 103a, a port 103b, and a port 103c. The port 103a is an input/output interface for the storage device 20A. The port 103b is an input/output interface for the storage device 20B. The port 103c is an input/output interface to the host system 30.

Each of the storage devices 20A and 20B comprises hardware components including a CPU 214 and a memory 202. The storage device 20A includes a port 203a which is an input/output interface for the virtualization switch 10. The storage device 20A also includes RAID (Redundant Array of Inexpensive Disks) groups (storage drive groups) A-0, A-1, and A-2 each including a plurality of disk drives. The storage device 20B includes a virtualization port 203b which is an input/output interface for the virtualization switch 10 and RAID groups B-0 and B-1 each including a plurality of disk drives. Note that the multiple disk drives in the RAID groups provide redundancy to each other. Although the disk drives in each of the RAID group are configured as RAID 5 in the present embodiment, any other configurations may be applied as long as multiple disk drives provide redundancy to each other (e.g., RAID 1).

The host system 30 comprises hardware components including a CPU 314, a memory 302, and a host bus adapter 303 serving as an input/output interface for the virtualization switch 10.

Figure 2:
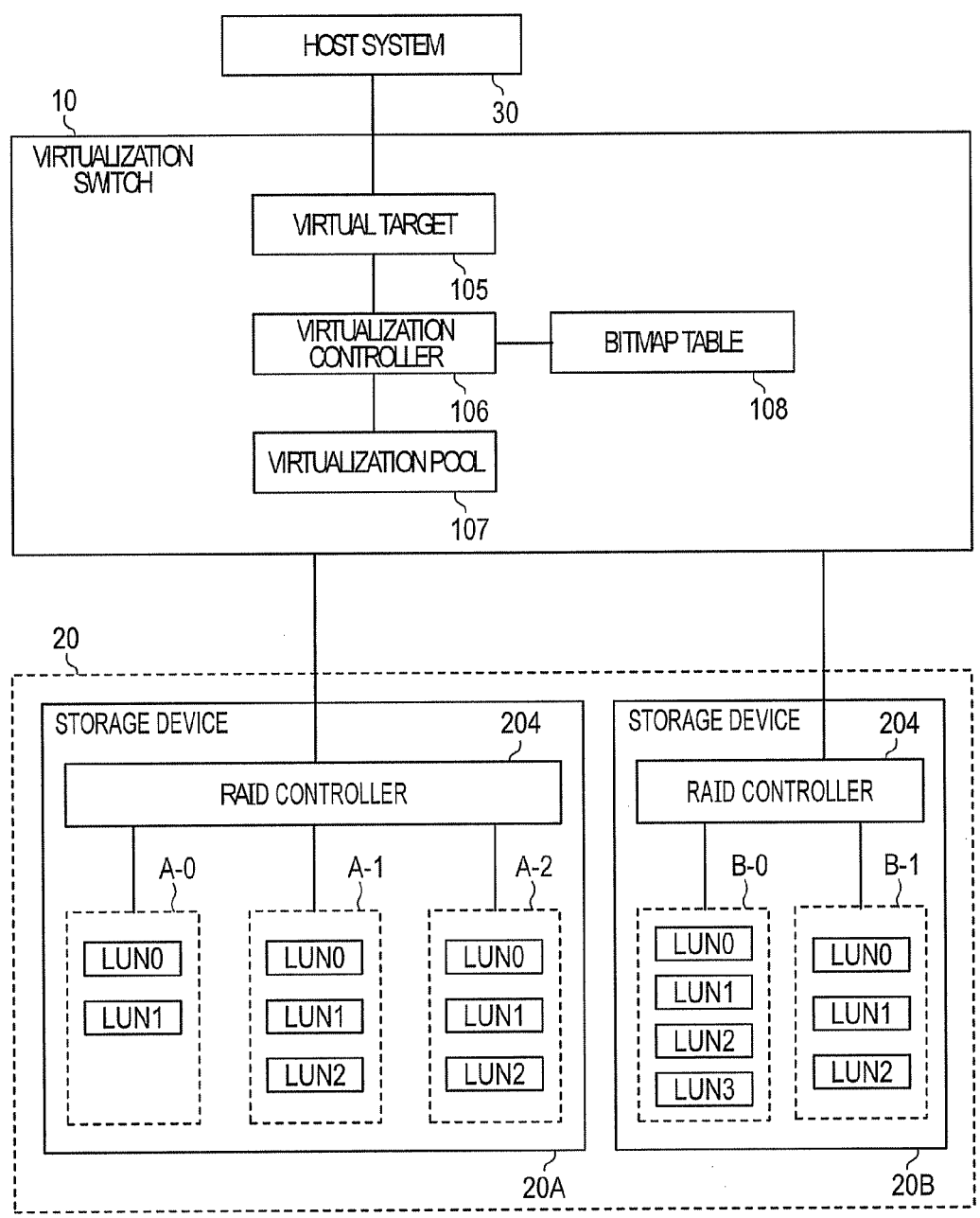
FIG. 2 illustrates a functional configuration of a virtualized system.

In the following, functional configurations of the individual devices in the virtualized system according to the present embodiment will be described. FIG. 2 illustrates a functional configuration of the virtualized system according to the present embodiment.

As illustrated in FIG. 2, in the virtualized system according to the present embodiment, the virtualization switch 10 includes functional components including a virtual target 105, a virtualization controller 106 (including a managing unit, a rebuilding controller, a first transferring unit, and a second transferring unit), a virtualization pool 107, and a bitmap table 108. Each of the storage devices 20 includes a RAID controller 204 as a functional component. Note that the individual functions in the virtualization switch 10 and the storage devices 20 are substantially realized by the CPUs provided therein. In addition, disk volumes in each of the storage devices 20 are presented as LUNs or logical volumes. The storage device 20A contains logical volumes of the RAID group A-0 (LUN0 and LUN1), logical volumes of the RAID group A-1 (LUN0, LUN1, and LUN2), and logical volumes of the RAID group A-2 (LUN0, LUN1, and LUN2). The storage device 20B contains logical volumes of the RAID group B-0 (LUN0, LUN1, LUN2, and LUN3) and logical volumes of the RAID group B-1 (LUN0, LUN1, and LUN2).

The virtual target 105 in the virtualization switch 10 is a virtual interface adapter for causing the host system 30 to recognize virtual volumes which will be described below. The virtualization pool 107 is a virtual area into which a LUN in the storage devices 20 connected to the virtualization switch 10 is to be loaded. In copying of a virtual volume described below, the virtual volume is partitioned into area, and the bitmap table 108 serves to store records as to whether or not each of the partitioned areas of a virtual volume has been copied. The virtualization controller 106 manages and controls the LUNS using the virtual target 105 and the virtualization pool 107. In addition, using the bitmap table 108, the virtualization controller 106 manages the status of the progress of copying of data in a virtual volume. The RAID controller 204 in each of the storage devices 20 manages the multiple disk drives contained in the storage device as RAID groups having redundancy and on the basis of the RAID groups constructs logical volumes having arbitrary capacities as LUNs.

Now, an outline of operations of the virtualized system according to the present embodiment will be described with reference to FIG. 3.

Figure 3:
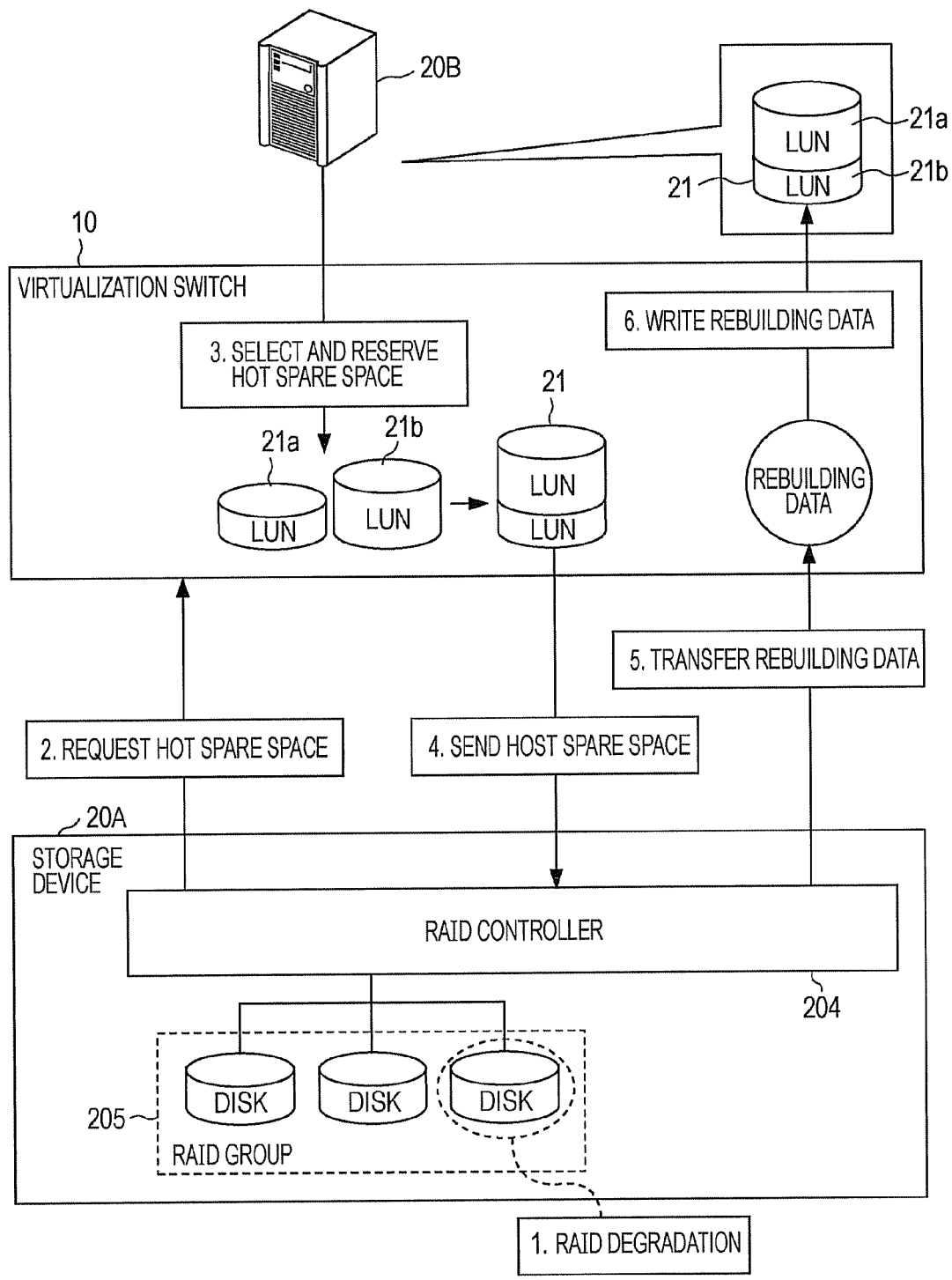
FIG. 3 illustrates an outline of operations of a virtualized system according to an embodiment.

As illustrated in FIG. 3, a RAID group 205 in the storage device 20A becomes degraded due to failure of a disk drive belonging to the RAID group 205, for example, the RAID controller 204 requests the virtualization switch 10 for a hot spare (HS) space 21. In response to the request, the virtualization switch 10 selects and reserves LUN 21a and LUN 21b which belong to a RAID group other than the degraded RAID group 205 for the hot spare space 21. Further, the virtualization switch 10 sends the reserved hot spare space 21 (the address of the LUNs constituting the hot spare space 21) to the RAID controller 204 of the storage device 20A as a response to the request. Upon receiving the hot spare space 21, the RAID controller 204 transfers rebuilding data (recovery data) to the virtualization switch 10. This rebuilding data is data reconstructed from data stored in a normal disk drive in the RAID group 205 to which the fault disk drive belongs and corresponding parity data. Using this rebuilding data, the degraded RAID group is rebuilt. Further, upon receiving the rebuilding data, the virtualization switch 10 transfers the rebuilding data to the LUN 21a and LUN 21b which have been set as the hot spare space 21. When the fault disk drive is recovered, the rebuilding data transferred and written to the hot spare space 21 is written back to the recovered disk drive by copyback processing. In the following description, the above-described processing is referred to as "rebuilding". In the manner described above, RAID redundancy of a RAID group to which a fault disk drive belongs may be maintained by writing rebuilding data to a virtual hot spare space.

Figure 4:
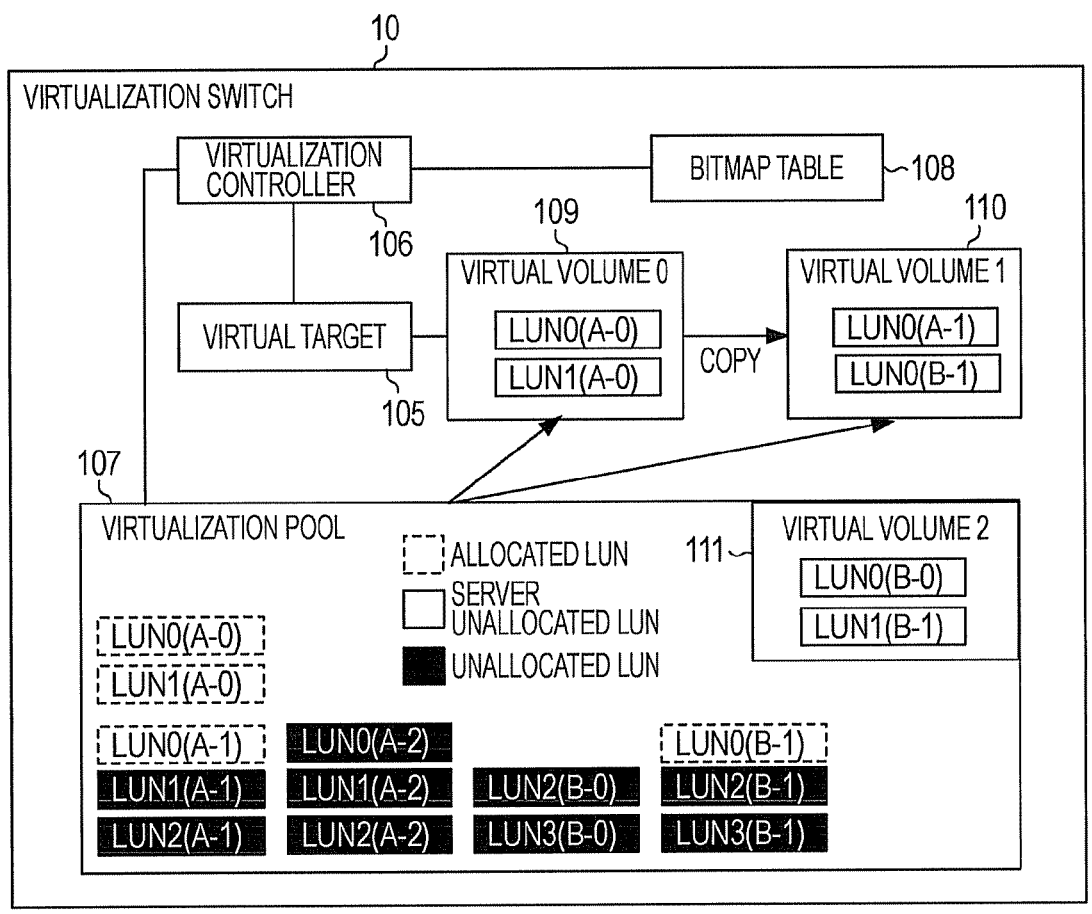
FIG. 4 illustrates an outline of operations of a virtualization switch.

Now, an outline of operations of the virtualization switch 10 in the virtualized system will be described. FIG. 4 illustrates an outline of operations of the virtualization switch 10. FIG. 5 illustrates a bitmap table. Note that in FIG. 4, individual LUNS are distinguished from each other by providing RAID volumes names to the LUNs such as a LUN0(A-0).

As illustrated in FIG. 4, the virtualization controller 106 of the virtualization switch 10 registers all LUNs of the storage devices 20 connected thereto in the virtualization pool 107. At this time, each LUN is provided with a hot spare attribute (first attribute information). This hot spare attribute is represented by "2", "1", or "0". "2" indicates that the LUN is dedicated for use as a hot spare space. "1" indicates that the LUN is available for use as a hot spare space. "0" indicates that the LUN is not to be used as a hot spare space.

The virtualization controller 106 may combine two or more of the registered LUNs and defines them as one virtual volume. The virtualization controller 106 may also partition one LUN into a plurality of parts to be defined as virtual volumes. Among the defined virtual volumes, a virtual volume 0 which is allocated to a host is recognized by the host system 30 via the virtual target 105. Note that the virtual target 105 is a virtual port, and a plurality of such ports may be created regardless of the number of the physical ports 103 of the virtualization switch 10. The virtualization controller 106 includes a replication function for mirroring the content of the virtual volume 0 (109) recognized by the host system 30 onto a virtual volume 1 (110) which is set as a copying destination (copying destination virtual volume). In such a copying destination virtual volume, either a "copying destination priority flag" or a "rebuilding priority flag" is set as attribute information (second attribute information). When a "copying destination priority flag" is set in a copying destination virtual volume, the copying destination virtual volume is not to be set as a hot spare space. On the other hand, when a "rebuilding priority flag" is set, the copying destination virtual volume may be set as a hot spare space. Further, the virtualization controller 106 includes a function of duplicating data from a LUN defined as a virtual volume in one of the storage devices 20 to a LUN in another one of the storage devices 20. A virtual volume 2 (111) is a volume which has neither been allocated by the host nor defined as a copying destination volume.

In data copying between virtual volumes by means of the functions described above, the virtualization switch 10 uses the bitmap table 108. As mentioned above, the bitmap table 108 is a table for storing records as to whether or not data in each of the partitioned fields in the virtual volume 0, serving as the copying source, has been copied to the corresponding fields in virtual volume 1 serving as the copying destination. As illustrated in FIG. 5, each record is represented by a flag value, and "1" indicates that data has not been copied at a corresponding field (uncopied) and "0" indicates that data has been copied. Using the flag values ("0" and "1"), the virtualization controller 106 determines the status of progress of copying data to the corresponding fields.

Figure 6:
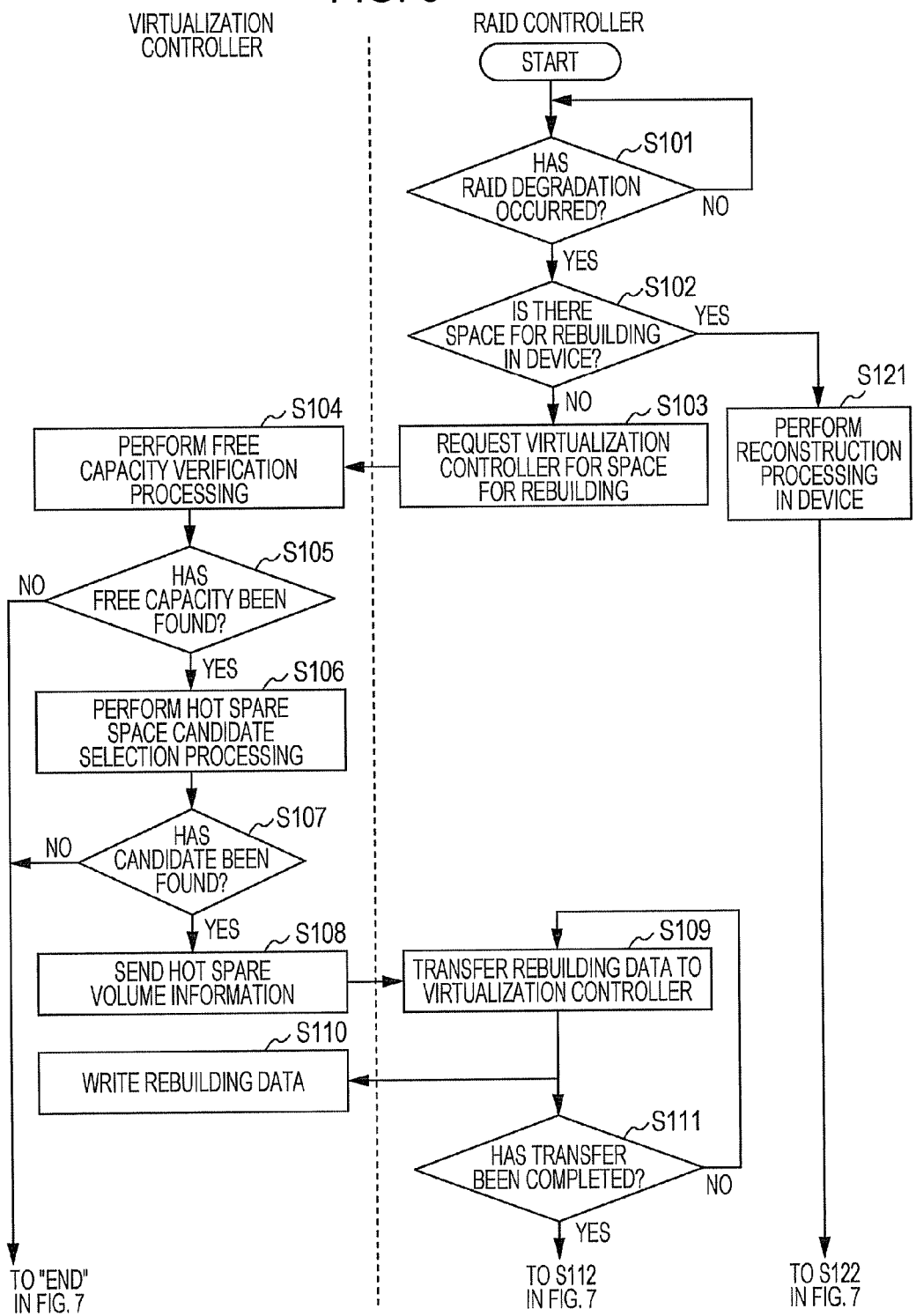
FIG. 6 is a flowchart illustrating an overall operation procedure in a virtualized system according to an embodiment.
Figure 7:
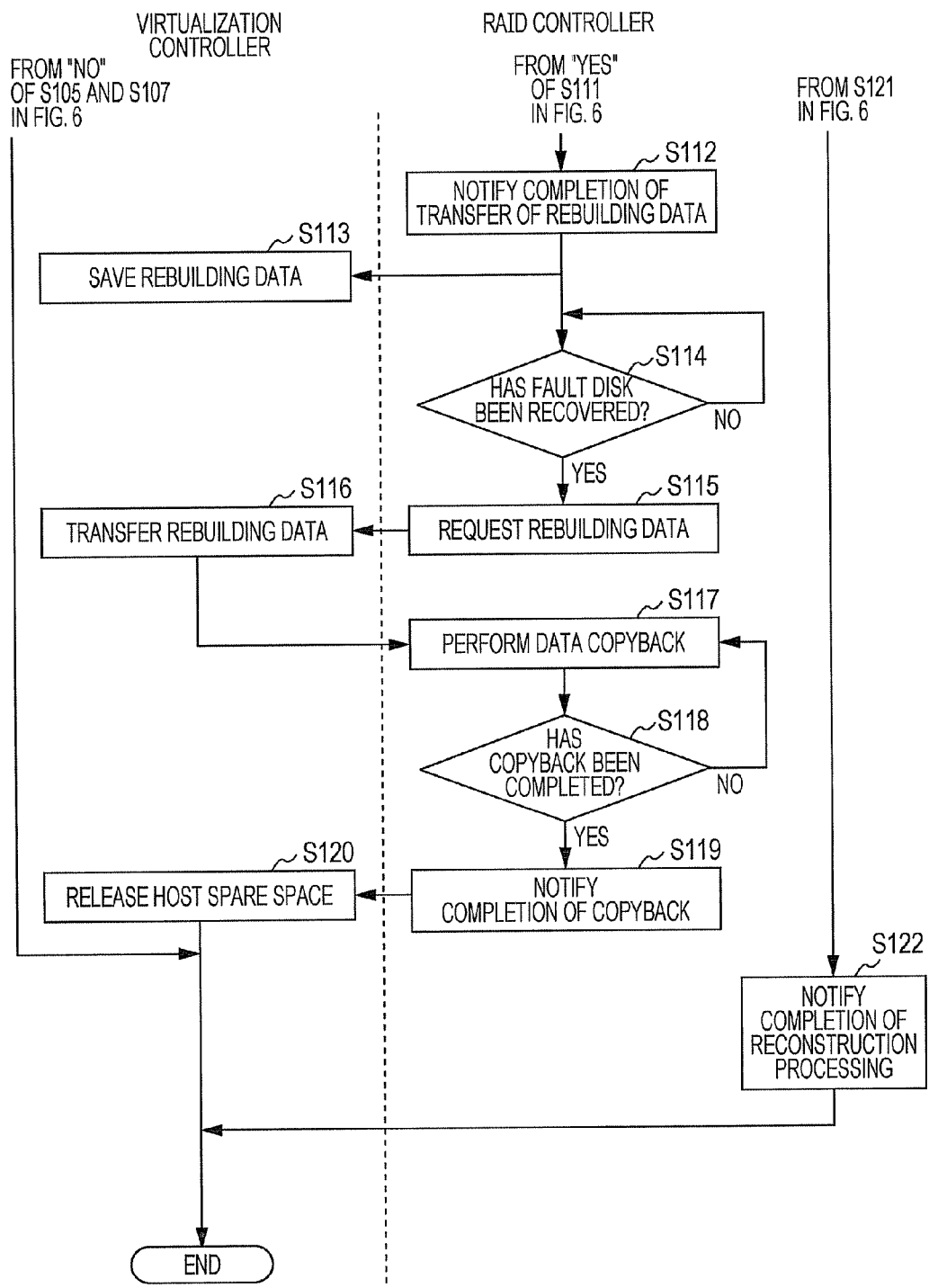
FIG. 7 is a flowchart illustrating the overall operation procedure in the virtualized system.

In the following, overall operations of the virtualized system according to the present embodiment will be described. FIG. 6 and FIG. 7 are flowcharts each illustrating a procedure of the overall operations of the virtualized system according to the present embodiment.

At Operation S101, the RAID controller 204 of the storage device 20A or the storage device 20B determines whether RAID degradation has occurred in disk drives in the device.

If it is determined in Operation S101 that RAID degradation has occurred in the device, at Operation S102 the RAID controller 204 determines whether there is a data area used for rebuilding in the device. That is, it is determined whether there is a sufficient capacity for performing restoration of a disk drive causing the RAID degradation (capacity equal to or larger than the size of the rebuilding data).

If it is determined in Operation S102 that there is no data area used for rebuilding in the device, at Operation S103 the RAID controller 204 sends the virtualization controller 106 of the virtualization switch 10 a request for a hot spare space as a data area allowing rebuilding.

In response to the request, at Operation S104, the virtualization controller 106 performs free capacity verification processing which will be described below. At Operation S105, the virtualization controller 106 determines whether there is free capacity for rebuilding, for each of all LUNs registered in the virtualization pool 107.

When it is determined in Operation S105 that there is free capacity for rebuilding, the virtualization controller 106 performs hot spare space candidate selection operation at Operation S106, which will be described below, to determines if there is a candidate for a hot spare space at Operation S107.

If it is determined in Operation S107 that there is a candidate for a hot spare space, at Operation S108 the virtualization controller 106 sends the RAID controller 204 hot spare volume information corresponding to a reserved hot spare space, as a response to the request.

Upon receiving the response, the RAID controller 204 transfers rebuilding data to the virtualization controller 106 at Operation 109, and determines whether the transfer of the rebuilding data has been completed at Operation S111. At Operation S110, the virtualization controller 106 sends the rebuilding data transferred from the RAID controller 204 to the hot spare space and writes the rebuilding data to a LUN that has been reserved for the hot spare space. Note that the status of progress of data writing to the hot spare space is managed by a storage device that contains the LUNs constituting the virtual volume 1.

If it is determined in Operation S111 that the transfer of the rebuilding data has been completed, the RAID controller 204 notifies the virtualization controller 106 of the completion of rebuilding data transfer at Operation S112. Then, at Operation S114, the RAID controller 204 determines whether the fault disk drive has been recovered by replacement or the like, i.e., whether the degraded RAID group has been rebuilt. Having received the notification, at Operation S113, the virtualization controller 106 saves the rebuilding data written to the hot spare space until a request is received.

If it is determined in Operation S114 that the fault disk has been recovered, at Operation S115 the RAID controller 204 requests the virtualization controller 106 for the rebuilding data.

Upon receiving the request for the rebuilding data, at Operation S116 the virtualization controller 106 transfers the rebuilding data saved in the hot spare space to the RAID controller 204. Specifically, the virtualization controller 106 sends the storage device that contains the LUN which has been reserved for the hot spare space a request for the rebuilding data and transfers the requested rebuilding data to the RAID controller 204 of the storage device to which the degraded RAID group belongs.

Upon receiving the rebuilding data, at Operation S117 the RAID controller 204 performs copyback of the rebuilding data to the recovered disk. In other words, data is restored by writing the rebuilding data back to the recovered disk. Subsequently, at Operation S118, the RAID controller 204 determines whether the copyback has been completed.

If it is determined in Operation S118 that the copyback has been completed, at Operation S119 the RAID controller 204 notifies the virtualization controller 106 of the completion of the copyback.

Upon receiving the notification, the virtualization controller 106 releases the hot spare space at Operation S120.

If it is determined in Operation S118 that the copyback has not been completed, at Operation S117 the RAID controller 204 continues the copyback of the rebuilding data to the recovered disk.

If it is determined in Operation S114 that the fault disk has not been recovered, the RAID controller 204 again determines if the fault disk has been recovered at Operation S114.

If it is determined in Operation S111 that the transfer of the rebuilding data has not been completed, the RAID controller 204 again transfers the rebuilding data to the virtualization controller 106 at Operation S109.

If it is determined in Operation S107 that there is no candidate for a hot spare space, the virtualization controller 106 terminates the operation procedure.

If it is determined in Operation S105 that there is no free capacity used for rebuilding, the virtualization controller 106 terminates the operation procedure.

It is determined in Operation S102 that there is a data area for rebuilding in the device, the RAID controller 204 performs reconstruction processing in the device at Operation S121 and notifies the virtualization controller 106 of the completion of the reconstruction processing at Operation S122. Note that in this reconstruction processing, data is reconstructed from a normal disk drive in the device without using a hot spare space, stored in a data space for rebuilding set in the device, and then written back to the disk drive.

If it is determined in Operation S101 that no RAID degradation has occurred in the device, the RAID controller 204 again determines whether RAID degradation has occurred in RAID groups in the device at Operation S101.

Figure 8:
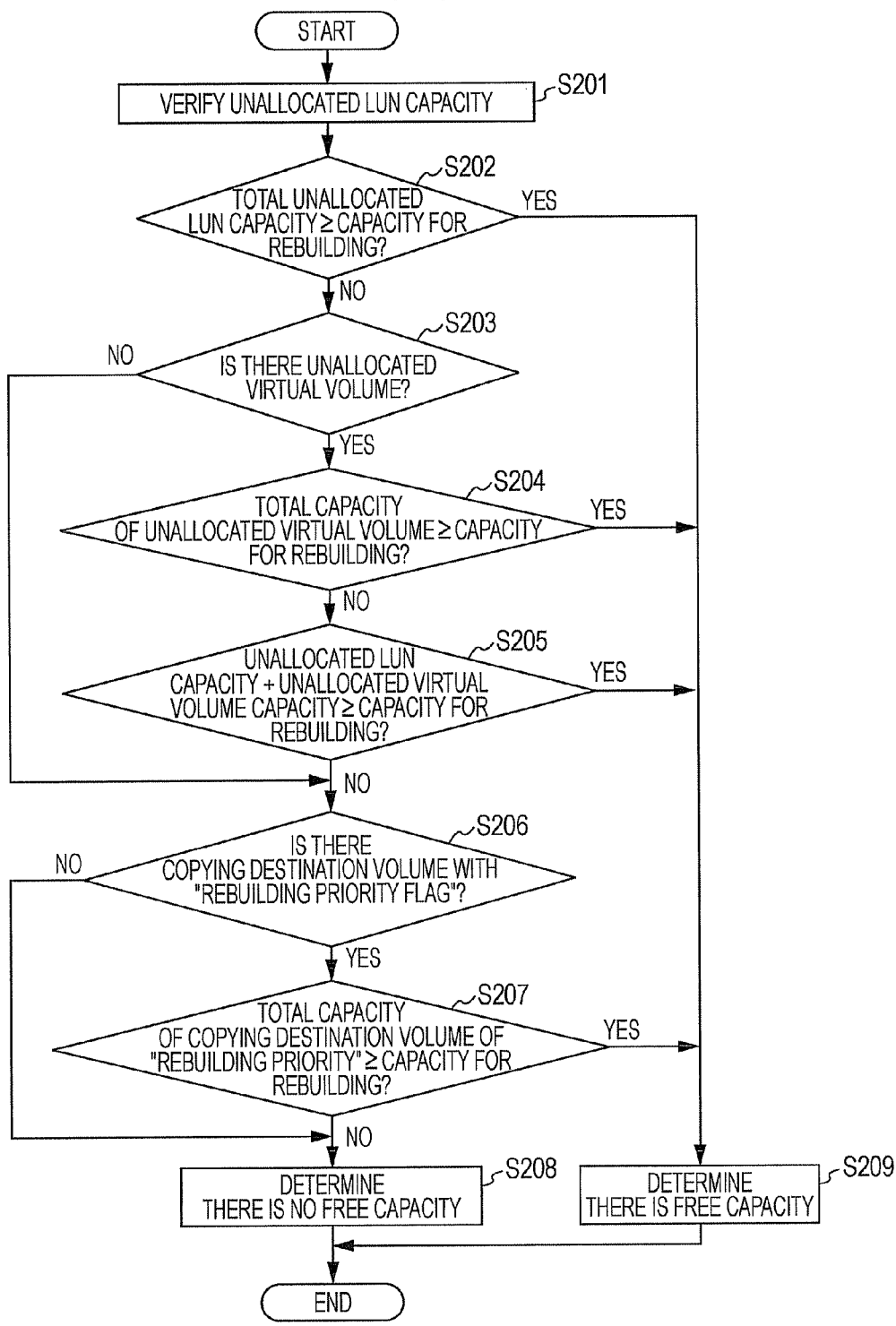
FIG. 8 is a flowchart illustrating an operation procedure of free capacity verification processing.

In the following, free capacity verification processing will be described. FIG. 8 is a flowchart illustrating a procedure of free capacity verification processing.

At Operation S201, the virtualization controller 106 verifies the total capacity of LUNs which have not been used (which have not been allocated to a virtual volume) (unallocated LUNs) among the LUNs registered in the virtualization pool 107. Then, at Operation S202, the virtualization controller 106 determines whether the capacity of the unallocated LUNs is equal to or larger than a capacity used for rebuilding.

If it is determined in Operation S202 that the total capacity of the unallocated LUNs is smaller than the capacity used for rebuilding, at Operation 203 the virtualization controller 106 determines whether there is a virtual volume which has not been used (which has neither been allocated to the host system 30 nor set as a copying destination) (an allocated virtual volume).

If it is determined in Operation 203 that there is an unallocated virtual volume, at Operation S204 the virtualization controller 106 determines whether the capacity of the unallocated virtual volume is equal to or larger than the capacity used for rebuilding.

If it is determined in Operation S204 that the capacity of the unallocated virtual volume is smaller than the capacity used for rebuilding, at Operation S205 the virtualization controller 106 determines whether the sum of the total capacity of the unallocated LUNs and the capacity of the unallocated virtual volume (combined capacity) is equal to or larger than the capacity used for rebuilding.

If it is determined in Operation S205 that the combined capacity is smaller than the capacity used for rebuilding, at Operation S206 the virtualization controller 106 determines if there is a virtual volume serving as a copying destination in which a "rebuilding priority" flag has been set (copying destination volume).

If it is determined in Operation S206 that there is a copying destination volume with a "rebuilding priority" flag, at Operation S207 the virtualization controller 106 determines whether the capacity of the copying destination volume with the "rebuilding priority" flag is equal to or larger than the capacity used for rebuilding.

If it is determined in Operation S207 that the total capacity of the copying destination volume with the "rebuilding priority" flag is smaller than the capacity used for rebuilding, at Operation S208 the virtualization controller 106 determines that there is no free capacity to meet the request from the RAID controller 204.

On the other hand, if it is determined in Operation S207 that the total capacity of the copying destination volume with the "rebuilding priority" flag is equal to or larger than the capacity used for rebuilding, at Operation S209 the virtualization controller 106 determines that there is free capacity to meet the request from the RAID controller 204.

If it is determined in Operation S206 that there is no copying destination volume with a "rebuilding priority" flag, at Operation S208 the virtualization controller 106 determines that there is no free capacity to meet the request from the RAID controller 204.

If it is determined in Operation S205 that the combined volume is equal to or larger than the capacity used for rebuilding, at Operation S209 the virtualization controller 106 determines that there is free capacity to meet the request form the RAID controller 204.

If it is determined in Operation S204 that the capacity of the unallocated virtual volume is equal to or larger than the capacity used for rebuilding, at Operation S209 the virtualization controller 106 determines that there is free capacity to meet the request from the RAID controller 204.

If it is determined in Operation S203 that there is no unallocated virtual volume, at Operation S206 the virtualization controller 106 determines whether there is a virtual volume serving as a copying destination in which a "rebuilding priority" flag has been set (copying destination volume).

If it is determined in Operation S202 that the total capacity of the unallocated LUNs is equal to or larger than the capacity used for rebuilding, at Operation S209 the virtualization controller 106 determines that there is an available capacity to meet the request from the RAID controller 204.

As described above, when degradation of a RAID group occurs, a LUN in a RAID group other than the degraded RAID group is dynamically allocated as a hot spare space. With this arrangement, it does not need to prepare storage devices used for hot spare spaces for the individual storage devices 20 constituting the virtualized system, making it possible to efficiently use the existing resources.

Figure 9:
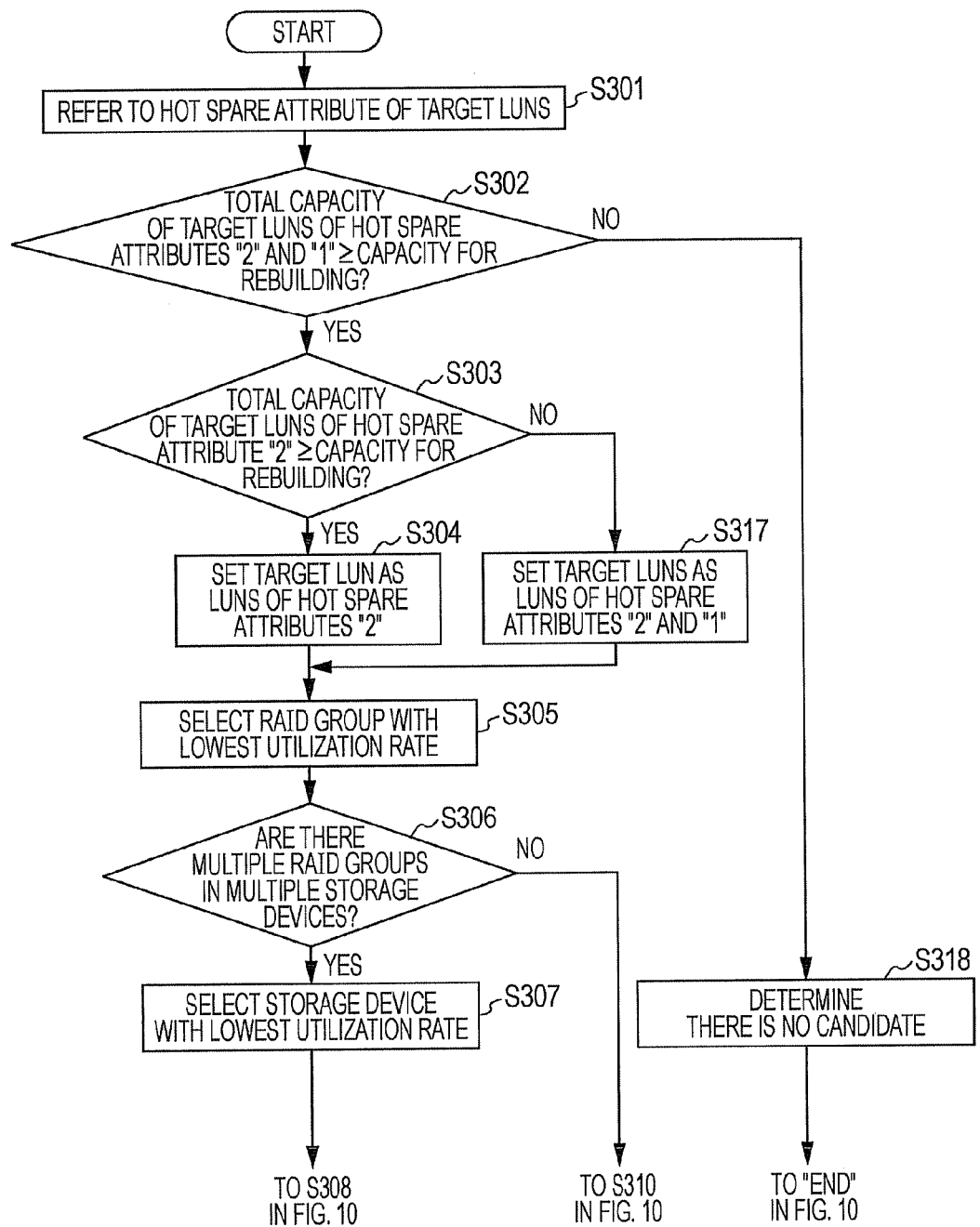
FIG. 9 is a flowchart illustrating an operation procedure of hot spare space candidate selection processing.
Figure 10:
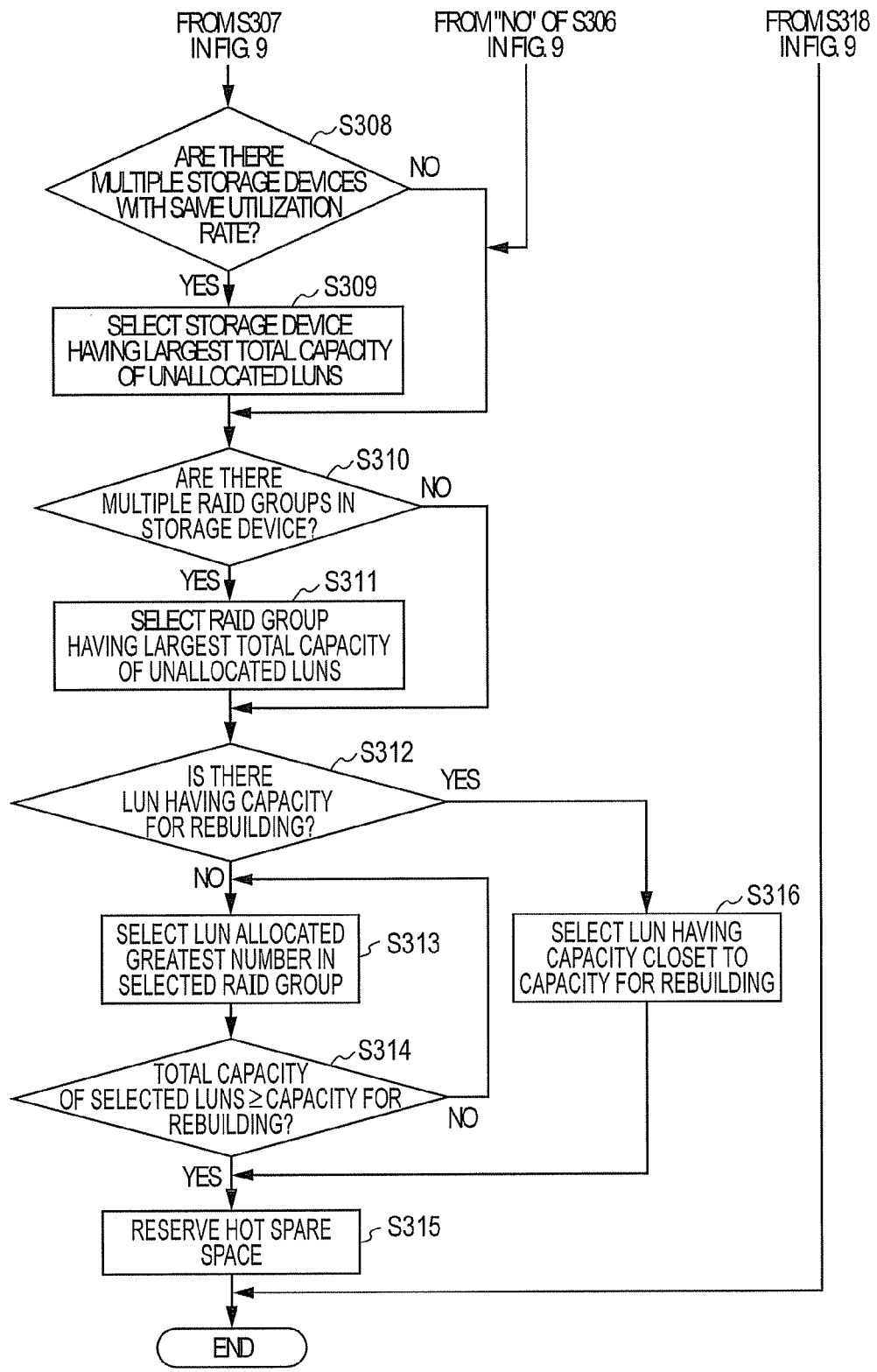
FIG. 10 is a flowchart illustrating an operation procedure of hot spare space candidate selection processing.

In the following, hot spare space candidate selection processing will be described. FIG. 9 and FIG. 10 are flowcharts illustrating an operation procedure of hot spare space candidate selection processing.

At Operation S301, the virtualization controller 106 refers to the hot spare attributes of target LUNs. Note that target LUNs refer to LUNs from among which one is to be selected as a hot spare space. All LUNs except those connected to the host system 30 by the virtual target 105 such as the LUNs used as the virtual volume 0 and LUNs that belong to a degraded RAID group may be set as target LUNs. It is also possible to select target LUNs on the basis of the free capacity verification processing described above. For instance, when the result of determination in Operation S204 is positive, LUNs in the unallocated virtual volume may be set as candidate LUNs.

Subsequently, at Operation S302, the virtualization controller 106 determines whether the total capacity of target LUNs of which the hot spare attributes are "2" and "1" is equal to or larger than the capacity used for rebuilding.

If it is determined in Operation S302 that the total capacity of the target LUNs of which the hot spare attributes are "2" and "1" is equal to or larger than the capacity used for rebuilding (the size of the rebuilding data), at Operation S303 the virtualization controller 106 determines whether the total capacity of the target LUNs with the hot spare attribute "2" is equal to or larger than the capacity used for rebuilding.

If it is determined in Operation S303 that the total capacity of the target LUNs with the hot spare attribute "2" is equal to or larger than the capacity used for rebuilding, at Operation S304 the virtualization controller 106 limits the target LUNs to the LUNs with the hot spare attribute "2". Subsequently, at Operation S305 the virtualization controller 106 selects a RAID group with the lowest utilization rate from among RAID groups containing the target LUNs. Note that the utilization rate of a RAID group is obtained by subtracting the capacity of LUNs in the RAID group which has been allocated to a virtual volume from the capacity of all LUNs in the RAID group. Further, at Operation S306, the virtualization controller 106 determines whether there is a plurality of such RAID groups in the multiple storage devices 20. That is, it is determined whether there is another RAID group having the same utilization rate as the selected RAID group in the storage devices 20.

If it is determined in Operation S306 that there is a plurality of RAID groups having the same utilization rate in the storage devices 20, at Operation S307 the virtualization controller 106 selects, from among the storage devices 20 containing the selected RAID groups, the one with the lowest utilization rate. The utilization rate of a storage device is obtained by subtracting LUNs allocated to a virtual volume from all LUNs in the device. At Operation S308, the virtualization controller 106 determines whether two or more of the selected storage devices have the same utilization rate.

If it is determined in Operation S308 that two or more of the selected storage devices have the same utilization rate, at Operation S309 the virtualization controller 106 selects from among the storage devices having the same utilization rate one having the largest total capacity of unallocated LUNs. Subsequently, at Operation S310, the virtualization controller 106 determines whether there is a plurality of RAID groups having the same utilization rate in the selected storage device.

If it is determined in Operation S310 that there is a plurality of RAID groups having the same utilization rate in the selected storage device, at Operation S311 the virtualization controller 106 selects, from among the RAID groups, the one having the largest total capacity of unallocated LUNs. Subsequently, at Operation S312, the virtualization controller 106 determines whether there is a LUN in the selected RAID group of which the capacity is equal to or larger than the capacity used for rebuilding.

If it is determined in Operation S312 that there is no LUN with a capacity equal to or larger than the capacity used for rebuilding, at Operation S313 the virtualization controller 106 selects LUNs for which the number allocated thereto is the greatest from among the LUNs in the selected RAID group. Subsequently, at Operation S314, the virtualization controller 106 determines whether the total capacity of the selected LUNs is equal to or greater than the capacity used for rebuilding.

If it is determined in Operation S314 that the total capacity of the selected LUNs is equal to or greater than the capacity used for rebuilding, at Operation S315 the virtualization controller 106 defines the selected LUNs as a hot spare space.

On the other hand, if it is determined in Operation S314 that the total capacity of the selected LUNs is smaller than the capacity used for rebuilding, at Operation S313 the virtualization controller 106 selects a LUN for which the number allocated thereto is the largest from among the LUNs in the selected RAID group except for those which have been selected in Operation S311.

If it is determined in Operation S312 that there is a LUN of which the capacity is equal to or larger than the capacity used for rebuilding, at Operation S316 the virtualization controller 106 selects a LUN with a capacity closest to the capacity used for rebuilding. This makes it possible to allocate a LUN with the minimum capacity to a hot spare space.

If it is determined in Operation S310 that there is not a plurality of RAID groups having the same utilization rate in the selected storage device (NO, in Operation S310), the virtualization controller 106 executes the processing of Operation S312.

If it is determined in Operation S308 that the selected storage devices do not include two or more storage devices having the same utilization ratio, the virtualization controller 106 performs the processing of Operation S310.

If it is determined in Operation S306 that there is not a plurality of RAID groups having the same utilization rate in the multiple storage devices 20, the virtualization controller 106 performs the processing of Operation S310.

If it is determined in Operation S303 that the total capacity of the target LUNs of which the hot spare attributes is "2" is smaller than the capacity used for rebuilding, at Operation S317 the virtualization controller 106 sets LUNs of which the hot spare attributes are "2" and "1" as target LUNs.

If it is determined in Operation S302 the total capacity of the target LUNs of which the hot spare attributes are "2" and "1" is smaller than the capacity used for rebuilding, at Operation S318 the virtualization controller 106 determines that there is not a candidate for a hot spare area and terminates the operation procedure.

As described above, in selection of a LUN to be used as a hot spare space, the virtualization controller 106 preferentially selects a LUN in a RAID group with a low utilization rate or a LUN in a storage device with a low utilization rate. This permits defining of a hot spare space with minimum influence on normal operations. In addition, the virtualization controller 106 selects a LUN to be used as a hot spare space on the basis of the attribute allocated to the LUN. This makes it possible to exclude a LUN which would cause inconvenience when used as a hot spare space from the candidates for the hot spare space.

Figure 11:
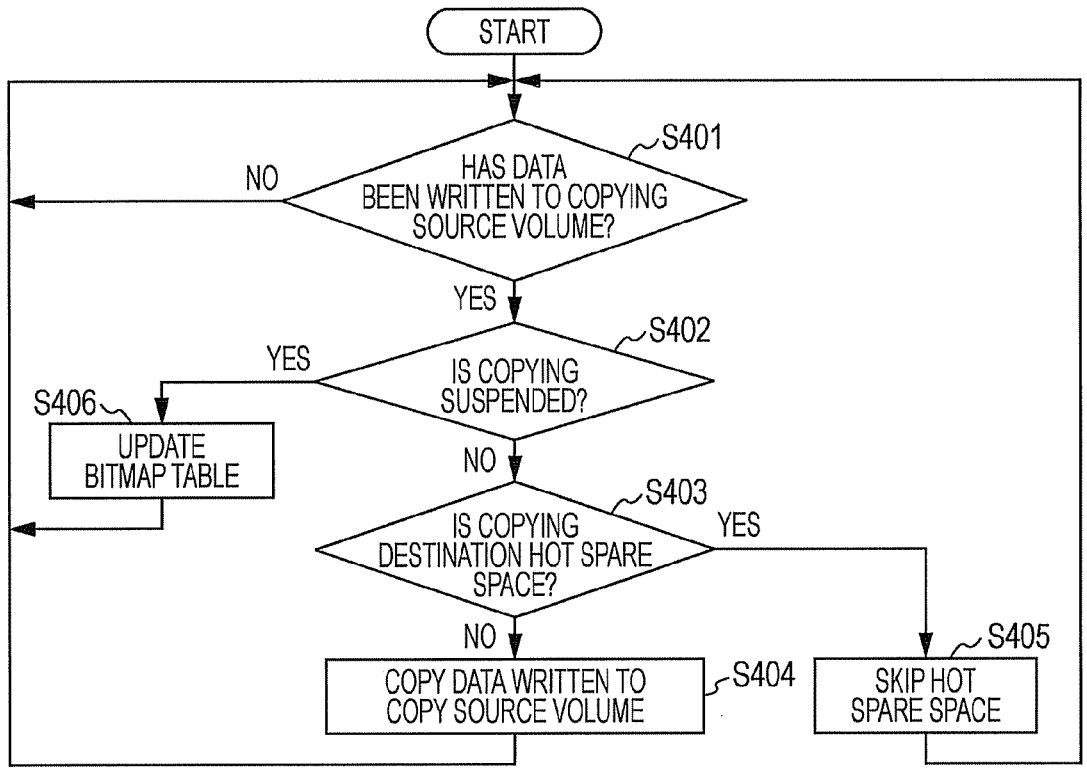
FIG. 11 is a flowchart illustrating an operation procedure of data copying to a copying destination virtual volume.

In the following, processing to be performed when a LUN in a virtual volume serving as a copying destination, such as a virtual volume 1 illustrated in FIG. 4, is set as a hot spare space. FIG. 11 is a flowchart illustrating an operation procedure of copying of data to a virtual volume serving as a copying destination virtual volume. FIG. 12 illustrates a bitmap table corresponding to a virtual volume in which a hot spare space is set. FIG. 13 illustrates a bitmap table corresponding to a virtual volume in which the setting of the hot spare space has been released. In the following description with reference to FIG. 11 to FIG. 13, a copying destination virtual volume is called the virtual volume 1 as in FIG. 4. Likewise, a virtual volume serving as a copying source is called the virtual volume 0. In FIG. 11, it is assumed that either one of LUNs constituting the virtual volume 1 has been set as a hot spare spaces.

As illustrated in FIG. 11, at Operation S401 the virtualization controller 106 determines whether data has been written to the virtual volume 0.

If it is determined in Operation S401 that data has been written to the virtual volume 0, at Operation S402 the virtualization controller 106 determines whether data copying to the virtual volume 1 is suspended.

If it is determined in Operation S402 that copying to the virtual volume 1 is not being suspended, at Operation S403 the virtualization controller 106 determines whether or not a copying destination in the virtual volume 1 is a hot spare space. More specifically, in the bitmap table 108 corresponding to the virtual volume 1, fields corresponding to a region to which the data is to be copied are referred to, so that it is determined if the copying destination is included in the hot spare space. Fields corresponding to a region set as the hot spare space are each forcedly fixed to "1" indicating that no data has been copied thereto (not copied). Writing and copying of data to the region corresponding to the bit fields fixed to "1" is inhibited until the setting of the hot spare space is released. To define a hot spare space in the bitmap table 108, it is possible to employ a technique in which another bitmap table 108 is prepared and fields corresponding to an undefined region are each set to "0" and fields corresponding to a region defined as a hot spare space are each set to "1". This technique allows the virtualization controller 106 to determines whether or not a field is included in a hot spare space by adding flags in corresponding bit fields in the two bitmap tables 108. Specifically, a field may be determined to be included in a hot spare space when the sum of corresponding flags is 2 and may be determined to be included in an undefined region when the sum is equal to or less than 1.

If it is determined in Operation S403 that the copying destination in the virtual volume 1 is not a hot spare space, at Operation S404 the virtualization controller 106 copies data in the virtual volume 0 to the virtual volume 1. When the copying is completed, the procedure returns to Operation S401 and the virtualization controller 106 again determines whether data has been written to the virtual volume 0.

If it is determined in Operation S403 that the copying destination in the virtual volume 1 is a hot spare space, at Operation s405 the virtualization controller 106 skips the hot spare space. Subsequently, at Operation S401 the virtualization controller 106 again determines whether data has been written to the virtual volume 0.

If it is determined in Operation S402 that the copying to the virtual volume 1 is being suspended, at Operation S406 the virtualization controller 106 updates the bitmap table 108 with respect to the fields to which the data has been written to the virtual volume 0. Then, the procedure returns to Operation S401 and the virtualization controller 106 again determines whether data has been written to the virtual volume 0.

If it is determined in Operation S401 that no data has been written to the virtual volume 0, the virtualization controller 106 again determines whether data has been written to the virtual volume 0 at Operation S401.

As described above, an undefined region and a region defined as a hot spare space are managed and distinguished using the bitmap table 108. This allows the virtualization controller 106 to write data in a copying source virtual volume and rebuilding data to a copying destination virtual volume.

Figure 14:
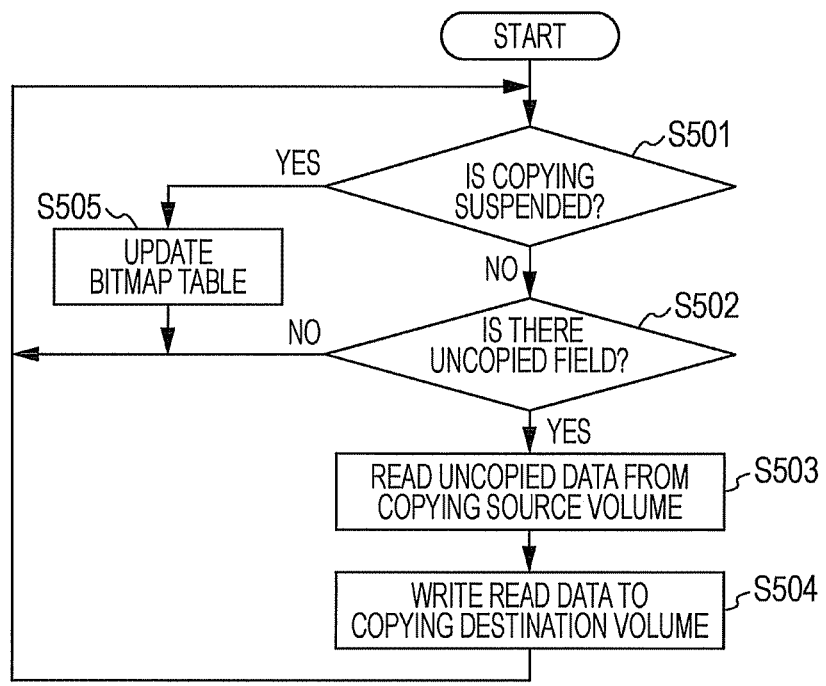
FIG. 14 is a flowchart illustrating processing of copying of data which has been written to a copying source virtual volume.
Figure 15:
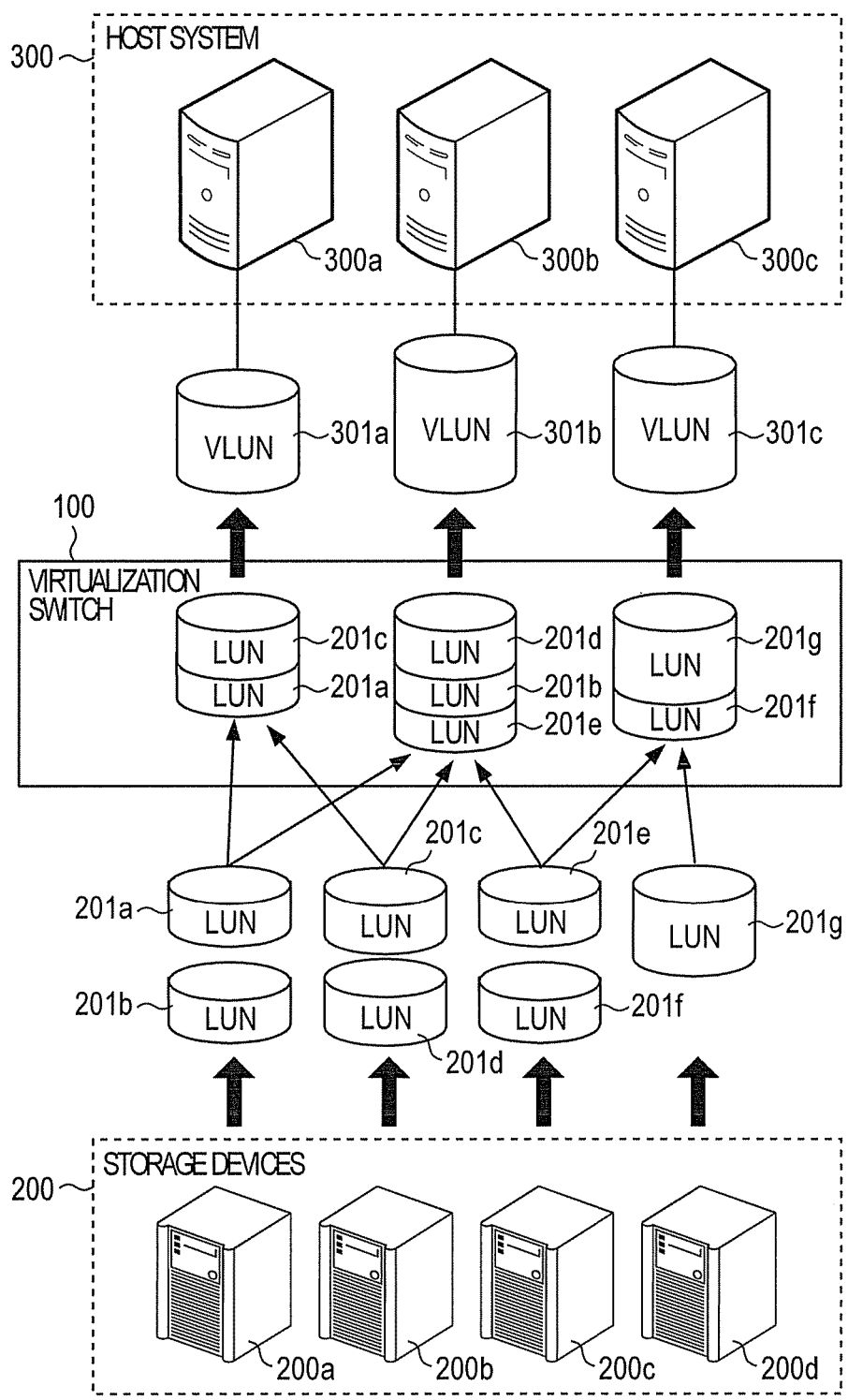
FIG. 15 illustrates a conventional system providing virtual volumes to host system.

Now, processing of copying data which has been written to a copying source virtual volume will be described. This processing includes copying of data corresponding to a released hot spare space from a copying source virtual volume to a copying destination virtual volume. FIG. 14 illustrates an operation procedure of copying processing of data which has been written to the copying source virtual volume. In the following description with reference to FIG. 14, as in the description with reference to FIG. 11, a copying destination virtual volume is called the virtual volume 1 and a copying source virtual volume is called the virtual volume 0.

At Operation S501, the virtualization controller 106 determines whether data copying to the virtual volume 1 is suspended.

If it is determined in Operation S501 that copying to the virtual volume 1 is not suspended, at Operation S502 the virtualization controller 106 refers to the bitmap table 108 to determine whether there is a field to which no data has been copied (uncopied field). Note that when a hot spare space is released, flags of the fields in the bitmap table 108 corresponding to the released hot spare space are set to "1", so that the fields are recognized as an uncopied region. That is, the released hot spare space is included in the uncopied region.

If it is determined in Operation in Operation S502 that there is an uncopied field, at Operation S503 the virtualization controller 106 reads data corresponding to the uncopied field from the virtual volume 0 and writes the read data to the virtual volume 1 at Operation S504. Then, the procedure returns to Operation S501 and the virtualization controller 106 again determines whether data copying to the virtual volume 1 is suspended.

On the other hand, if it is determined in Operation S502 that there is no uncopied field, the procedure returns to Operation S501 and the virtualization controller 106 again determines whether data copying to the virtual volume 1 is suspended.

If it is determined in Operation S501 that data copying to the virtual volume 1 is suspended, at Operation S505 the virtualization controller 106 updates the bitmap table 108 with respect to the fields to which data has been copied from the virtual volume 0 to the virtual volume 1. Then, the procedure returns to Operation S501 and the virtualization controller 106 again determines whether data copying to the virtual volume 1 is suspended.

As described above, when a hot spare space is released, the flags in the fields corresponding to the released hot spare space in the bitmap table 108 are set to "1". Thus, copying of data to the released hot spare space is resumed.

The present technique may be embodied in various modifications without departing from the essence or essential characteristics thereof. Thus, the embodiment described above is merely illustrative in all respects and should not be restrictively construed. The scope of the present technique is defined by the appended claims but not restrained by the specification at all. Further, modifications, improvements, substitutions, and reformations belonging to the equivalent of the scope of the claims are all within the scope of the present technique.

According to the present technique, effective use of storage resources may be achieved in allocation of hot spare space in a system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage area managing apparatus for managing a plurality of storage drive groups each of which has a plurality of storage drives providing redundancy for each other, the storage area managing apparatus comprising:
   a processor; and
   a memory which stores a plurality of instructions, which when executed by the processor, cause the processor to execute:
      managing a plurality of logical volumes provided by the plurality of storage drive groups to store the data redundantly;
      generating recovery data, when at least one of the plurality of storage drive groups has at least one of the plurality of storage drives which is degraded, on the basis of the data stored in the at least one storage drive group having the at least one degraded storage drive;

generating a selected logical volume from among the plurality of logical volumes provided by the plurality of storage drive groups on the basis of the capacity of the recovery data, the generating the selected logical volume including selecting one of the plurality of storage drive groups with a lowest utilization rate from among storage drive groups containing target logical volumes, by subtracting a capacity of storage drives in the selected storage drive group which have been allocated a logical volume, from the capacity of all storage drives in the selected storage drive group;

managing first logical volumes selected from the plurality of storage drive groups excluding the at least one storage drive group having the at least one degraded storage drive; and first transferring the recovery data to the part of the plurality of storage drive groups as indicated by the selected logical volume.

2. The storage area managing apparatus of claim 1, further comprising:

second transferring, when the at least one storage drive group having the at least one degraded storage drive is rebuilt, the recovery data from the storage drive group to which the recovery data has been transferred by the first transferring to the rebuilt storage drive group.

3. The storage area managing apparatus of claim 1, wherein the generating the selected logical volume selects at least one of a plurality of second logical volumes from the first logical volumes as the selected volume, the second logical volumes belonging to a storage drive group having the least percentage of logical volumes allocated to an upper system.

4. The storage area managing apparatus of claim 3, wherein when there are two or more logical volumes among the second logical volumes, each having a capacity equal to or larger than the size of the recovery data, the generating the selected logical volume selects, from the logical volumes each having a capacity equal to or larger than the size of recovery data, the ones each having capacity closest to the size of the recovery data as the selected volumes.

5. The storage area managing apparatus of claim 1, wherein the generating the selected logical volume selects from the first logical volumes a logical volume as a candidate for the selected volume, the logical volume being managed by the managing the first logical volumes with first attribute information indicating whether or not the logical volume may be selected as the selected volume.

6. The storage area managing apparatus of claim 1, wherein a copying destination volume which is at least one of the logical volumes and is set as a destination to which data stored in a logical volume allocated to an upper system is copied is managed by the managing with second attribute information indicating whether or not the logical volume constituting the copying destination volume may be selected as the selected volume, and wherein when the logical volume constituting the copying destination volume is included in the first logical volumes, the generating excludes the logical volume constituting the copying destination volume managed with the second attribute information indicating that the logical volume may not be selected as the selected volume, from the candidates for the selected volume.

7. A storage area managing method for managing a plurality of storage drive groups each of which has a plurality of storage drives providing redundancy for each other, the storage area managing method comprising:

managing a plurality of logical volumes provided by the plurality of storage drive groups for storing the data redundantly;

generating recovery data when at least one of the plurality of storage drive groups has at least one of the plurality of storage drives which is degraded on the basis of the data stored in the at least one storage drive group having the at least one degraded storage drive;

generating a selected logical volume from among the plurality of logical volumes provided by the plurality of storage drive groups on the basis of the capacity of the recovery data, the generating the selected logical volume including selecting one of the plurality of storage drive groups with a lowest utilization rate from among storage drive groups containing target logical volumes, by subtracting a capacity of storage drives in the selected storage drive group which have been allocated a logical volume, from the capacity of all storage drives in the selected storage drive group;

managing first logical volumes selected from the plurality of storage drive groups excluding the at least one storage drive group having the at least one degraded storage drive; and transferring the recovery data to the part of the plurality of storage drive groups as indicated by the selected logical volume.

8. The storage area managing method of claim 7, further comprising:

when the at least one storage drive group having the at least one degraded storage drive is rebuilt, requesting the storage drive group to which the recovery data has been transferred in the transferring for the recovery data; and transferring the recovery data transferred in response to the request in the requesting, to the rebuilt storage drive group.

9. The storage area managing method of claim 7, wherein at least one of a plurality of second logical volumes is selected from the first logical volumes as the selected volume, the second logical volumes belonging to a storage drive group having the least percentage of logical volumes allocated to an upper system.

10. The storage area managing method of claim 9, wherein in the generating the selected logical volume, when there are two or more logical volumes among the second logical volumes, each having a capacity equal to or larger than the size of the recovery data, a plurality of logical volumes each having capacity closest to the size of the recovery data are selected as the selected volumes, from the logical volumes each having a capacity equal to or larger than the size of recovery data.

11. The storage area managing method of claim 7, wherein in the generating the selected logical volume, selecting from the first logical volumes, a logical volume managed with first attribute information indicating that the logical volume may be selected as the selected volume is selected as a candidate for the selected volume.

12. The storage area managing method of claim 7, wherein a copying destination volume which is at least one of the logical volumes and is set as a destination to which data stored in a logical volume allocated to an upper system is copied is managed in the managing with second attribute information indicating whether or not the logical volume constituting the copying destination volume may be selected as the selected volume, and wherein in the generating the selected logical volume, when the logical volume constituting the copying destination volume is included in the first logical volumes, the logical volume constituting the copying destination volume managed with the second attribute information indicating that the logical volume may not be selected as the selected volume is excluded from the candidates for the selected volume.

* * * * *